(12) United States Patent  (10) Patent No.: US 8,634,721 B2
Sakuramoto et al.  (45) Date of Patent: Jan. 21, 2014

(54) METHOD, SYSTEM, AND APPARATUS FOR OPTICAL COMMUNICATION

(75) Inventors: Shinichi Sakuramoto, Kawasaki (JP); Toru Matsuyama, Kawasaki (JP)

(73) Assignee: Fujitsu Optical Components Limited, Kawasaki (JP)

( * ) Notice: Subject to any disclaimer, the term of this patent is extended or adjusted under 35 U.S.C. 154(b) by 337 days.

(21) Appl. No.: 12/929,135

(22) Filed: Jan. 3, 2011

(65) Prior Publication Data

US 2011/0170874 A1  Jul. 14, 2011

(30) Foreign Application Priority Data

Jan. 8, 2010  (JP) ................................. 2010-003222

(51) Int. Cl.
*H04B 10/00* (2013.01)
(52) U.S. Cl.
USPC ............................. 398/140; 398/182; 398/202
(58) Field of Classification Search
USPC .......................................... 398/140, 182, 202
See application file for complete search history.

(56) References Cited

U.S. PATENT DOCUMENTS

| | | | |
|---|---|---|---|
| 5,430,766 A * | 7/1995 | Ota et al. ...................... | 375/318 |
| 5,955,921 A | 9/1999 | Ide et al. | |
| 6,907,202 B1 * | 6/2005 | Ide et al. ...................... | 398/208 |
| 2004/0164232 A1 | 8/2004 | Nakagawa | |
| 2004/0190912 A1 * | 9/2004 | Seo et al. ...................... | 398/202 |
| 2007/0165710 A1 * | 7/2007 | Alameh et al. ................ | 375/220 |
| 2009/0226188 A1 * | 9/2009 | Komatsu ...................... | 398/202 |

FOREIGN PATENT DOCUMENTS

| | | |
|---|---|---|
| JP | 8-4755 | 2/1996 |
| JP | 08-102717 | 4/1996 |
| JP | 2001-211040 | 8/2001 |
| JP | 2002-353753 | 12/2002 |
| JP | 2004-260230 | 9/2004 |
| JP | 2009-177577 | 8/2009 |

OTHER PUBLICATIONS

Japanese Office Action for related Japanese Patent Application No. 2010-003222, mailed Nov. 19, 2013, 6 pages.

* cited by examiner

*Primary Examiner* — Dzung Tran
(74) *Attorney, Agent, or Firm* — Staas & Halsey LLP

(57) ABSTRACT

An optical communication method includes outputting an optical data signal in which a signal amplitude of a non-data area that is an area other than a data area is made higher than a signal amplitude of the data area, to a predetermined receiver, receiving an optical input including the optical data signal with the predetermined receiver, detecting each of the signal amplitude of the non-data area and the signal amplitude of the data area of the optical input, creating a threshold for encoding the data area based on the signal amplitude of the data area, determining whether the optical data signal is received, based on the signal amplitude of the non-data area, and outputting a data signal in which the data area is encoded by using the threshold of the optical data signal, when it is determined that the optical data signal is received.

8 Claims, 17 Drawing Sheets

| TRANS-MISSION RATE | MINIMUM RECEPTION-LEVEL REQUIREMENT (ITU-T) | BER REQUIRE-MENT | S/N RATIO | BURST-SIGNAL DETECTION ERROR (K=2) |
|---|---|---|---|---|
| 1.2 G | −28.0 dBm | $<10^{-12}$ | 14.2 | 3.50% |
| 10 G | −28.0 dBm | $<10^{-3}$ | 4.8 | 10.4% |

| TRANS-MISSION RATE | MINIMUM RECEPTION-LEVEL REQUIREMENT (IEEE) | MINIMUM RECEPTION-LEVEL REQUIREMENT (ITU-T) | BER REQUIRE-MENT | TIA TRANSIMPEDANCE RATIO |
|---|---|---|---|---|
| 1.2 G | -29.5 dBm | -28.0 dBm | $<10^{-12}$ | 1 |
| 2.5 G | - | -28.0 dBm | $<10^{-12}$ | 1/2 |
| 10 G | -28.0 dBm | -28.0 dBm | $<10^{-3}$ | 1/8 |

| TRANS-MISSION RATE | MINIMUM RECEPTION-LEVEL REQUIREMENT (ITU-T) | BER REQUIRE-MENT | S/N RATIO | BURST-SIGNAL DETECTION ERROR |
|---|---|---|---|---|
| 1.2 G | -28.0 dBm | $<10^{-12}$ | 14.2 | 7.00% |
| 10 G | -28.0 dBm | $<10^{-3}$ | 4.8 | 20.8% |

METHOD, SYSTEM, AND APPARATUS FOR OPTICAL COMMUNICATION

CROSS-REFERENCE TO RELATED APPLICATION

This application is based upon and claims the benefit of priority of the prior Japanese Patent Application No. 2010-003222, filed on Jan. 8, 2010, the entire contents of which are incorporated herein by reference.

FIELD

The embodiments discussed herein are directed to an optical communication method, an optical communication system, an optical-signal receiving apparatus, and an optical-signal transmitting apparatus.

BACKGROUND

Conventionally, Fiber To The X (FTTX) is known as a configuration of a network of optical communication. FTTX is a system of a network configuration that connects a building of a user and a station facility of a communication carrier, and there are various systems depending on a laying situation of optical fibers. FIG. 16 is an explanatory diagram for explaining an example of a configuration of FTTX.

According to an FTTX system example depicted in FIG. 16, a building of a user and a station facility of a communication carrier are coupled with optical fiber, the FTTX system includes optical network terminals (ONTs) 1 to 3 as a terminal device on the user side, and an optical line terminal (OLT) 5 as a terminal device on the communication carrier side. Moreover, the FTTX includes a star coupler 4 that multiplexes or demultiplexes optical signals that are transmitted and received between the ONTs 1 to 3 and the OLT 5.

For example, the ONTs 1 to 3 are placed in respective buildings of users, and perform transmission and reception of data to and from the OLT 5 via the star coupler 4. The OLT 5 then transmits transmission data to the ONTs 1 to 3 with continuous signals in a band at 1.49 micrometers. Moreover, the OLT 5 receives burst signals as reception data that are time-division multiplex in a band at 1.31 micrometers, and respectively transmitted from the ONTs 1 to 3.

FIG. 17 is an explanatory diagram for explaining a burst signal receiver. A burst signal receiver 10 is placed inside the OLT 5 depicted in FIG. 16, and is coupled to a retiming block 20 that performs clock extraction from a received signal, as depicted in FIG. 17. Moreover, as depicted in FIG. 17, the burst signal receiver 10 includes a light receiving element 11, a preamplifier 12, an amplitude detecting circuit 13, a threshold creating circuit 14, a comparator 15, an amplifier 16, and an output buffer 17.

The light receiving element 11 receives an optical signal, and converts it into a current signal. The preamplifier 12 then converts the current signal converted by the light receiving element 11 into a voltage signal at a certain level. The amplitude detecting circuit 13 detects an amplitude from the voltage signal converted by the preamplifier 12; and the threshold creating circuit 14 creates a code identifying threshold that is a threshold for identifying a code of an optical signal that is input based on the amplitude detected by the amplitude detecting circuit 13.

The comparator 15 compares the upper-end level of an amplitude of the optical signal detected by the amplitude detecting circuit 13 and a certain threshold that is predetermined, and outputs a comparison result to the output buffer 17. The amplifier 16 encodes the voltage signal converted by the preamplifier 12 by using the code identifying threshold created by the threshold creating circuit 14. The output buffer 17 determines whether the optical signal is a burst signal from the comparison result by the comparator 15, and outputs to the retiming block 20 a signal input from the amplifier 16, only if the optical signal is a burst signal.

Specifically, in order to avoid that a noise is output as a signal from the burst signal receiver 10, the output buffer 17 outputs a signal input from the amplifier 16, only when the upper-end level of the amplitude of the burst signal is equal to or higher than the certain threshold. As for the examples of the conventional technologies, refer to Japanese Examined Utility Model Application Publication No. 08-4755, and Patent Document 2: Japanese Laid-open Patent Publication No. 2004-260230, for example.

However, according to the conventional technology described above, there is a problem. The detection precision of burst signal deteriorates in a burst signal receiver when the transmission rate of optical signal is increased by using an existing circuit. Such deterioration cannot be improved without deterioration in detected signal quality. The following description explains deterioration in detection precision of burst signal that arises when shifting the "transmission rate" of optical signal from "1.2 Gigabit per second (Gbps)" to "10 Gbps" by using an existing circuit, and then explains problems of the conventional technology.

To begin with, when the transmission rate of optical signal is increased, the signal amplitude of a burst signal is decreased. FIG. 18 is an explanatory diagram for explaining a Trans Impedance Amplifier (TIA) transimpedance ratio with respect to each transmission rate. FIG. 18 is a table in which a transmission rate is associated with a minimum reception-level requirement (IEEE), a minimum reception-level requirement (ITU-T), a BER requirement, and a TIA transimpedance ratio.

"Transmission rate" indicates the number of bits to be transmitted per second; and "minimum reception-level requirement (IEEE)" indicates an attenuation allowance of optical signal in a communication channel in accordance with Institute of Electrical and Electronics Engineers (IEEE) standards. Moreover, "minimum reception-level requirement (ITU-T)" indicates an attenuation allowance of optical signal in a communication channel in accordance with International Telecommunication Union Telecommunication Standardization Sector (ITU-T) standards. Furthermore, "bit error rate (BER) requirement" indicates an allowable range of bit error included in received data; and "TIA transimpedance ratio" indicates a converting ratio to a voltage by a TIA included in the preamplifier 12.

As depicted in FIG. 18, at "transmission rate: 1.2 G", the other items are "minimum reception-level requirement (IEEE): −29.5 dBm, minimum reception-level requirement (ITU-T): −28.0 dBm, BER requirement: $<10^{-12}$, and TIA transimpedance ratio: 1". At "transmission rate: 2.5 G", the other items are "minimum reception-level requirement (IEEE): −, minimum reception-level requirement (ITU-T): −28.0 dBm, BER requirement: $<10^{-12}$, and TIA transimpedance ratio: 1/2". Accordingly, an optical burst signal needs to be identified with a reception level <−28.0 dBm.

On the other hand, when "transmission rate" is shifted to "10 G", the other items are "minimum reception-level requirement (IEEE): −28.0 dBm, minimum reception-level requirement (ITU-T): −28.0 dBm, BER requirement: $<10^{-3}$, and TIA transimpedance ratio: 1/8". In other words, when "transmission rate" is shifted to "10 G" while the attenuation allowance of optical signal in the current communication channel remains the same, despite that "TIA transimpedance ratio" decreases, it is needed to identify an optical burst signal at a reception level <−28.0 dBm.

FIG. 19 is an explanatory diagram for explaining a BER property. The vertical axis of FIG. 19 denotes BER, and the horizontal axis denotes minimum reception-level requirement (dBm). As depicted with a broken line in FIG. 19, the BER property of "1.2 G/2.5 G BER" is indicated by a straight line connecting "minimum reception-level requirement: −28, BER: 1E-12" and "minimum reception-level requirement: −34, BER: 1E-3".

On the other hand, as depicted with a solid line in FIG. 19, the BER property of "10 G BER" is indicated by a straight line connecting "minimum reception-level requirement: −22, BER: 1E-12" and "minimum reception-level requirement: −28, BER: 1E-3". In other words, when the transmission rate is shifted to "10 G", the burst-signal receiver detects optical signals at a level that is "6 dBm" lower than "minimum reception-level requirement: −22" for "BER requirement: 1E-12".

Along the shift of the transmission rate, the frequency property of the TIA is set optimally. As a frequency property of a TIA, "cutoff frequency: fc", which is a marginal frequency that causes gain reduction, is explained below. FIG. 20 is an explanatory diagram for explaining a cutoff frequency of a TIA. The cutoff frequency of a TIA is obtained by Expression (1) and Expression (2) using "feedback resistor: Rf", "open gain: G", "parasitic capacity of light receiving element: Cpd", and "parasitic capacity of TIA input: Ci", depicted in FIG. 20. "Ri" denotes input impedance.

$$Ri = Rf/G \quad (1)$$

$$fc = 1/(2*\pi*Ri*(Cpd+Ci)) \quad (2)$$

As expressed in Expression (2), the cutoff frequency includes "Ri: input impedance", and when shifting the transmission rate from "1.2 G" to "10 G", the TIA needs approximately eight times the band, so that "Ri" is to be divided to approximately 1/8. In other words, an output amplitude of a voltage signal output from the TIA turns to approximately 1/8, and detection precision of burst signal is deteriorated.

Moreover, when a speedup of the transmission rate of optical signal is implemented, an output level from the TIA decreases because of a tail current or transient response characteristics of the light receiving element. Specifically, when there is a level difference about 20 dBm in the signal level between consecutive time-division multiplex burst signals, an output level from the TIA decreases due to a tail current or transient response characteristics of the light receiving element. FIG. 21 is an explanatory diagram for explaining deterioration in the amplitude of a burst signal. "Burst signal" depicted in FIG. 21 denotes a burst signal input into a light receiving element, and "APD multiplication factor change" denotes change in multiplication factor of burst signal by avalanche photodiode (APD), which is a light receiving element; and "TIA output" denotes output of a voltage signal output from the TIA.

As depicted in FIG. 21, burst signals input into the APD are consecutive burst signals (n and n+1) attenuated by "−8 dBm", and "−28 dBm", respectively; and GT (guard time) between the burst signals is tens nanoseconds. In the above case, as depicted in FIG. 21, regarding the multiplication factor in the APD, when shifting from the n-th burst signal to the (n+1)th burst signal, a delay occurs in the recovery of the multiplication factor, resulting in a need for a few microseconds of a multiplication factor recovery delay time. Due to a delay until reaching a desirable multiplication factor of the (n+1)th burst signal, the multiplication factor in the APD changes, and deterioration of the amplitude due to lack of the required multiplication factor is produced on a voltage signal to be output to the TIA, consequently detection precision of burst signal is deteriorated. The limiter level is at the maximum output of the TIA.

Furthermore, when a speedup of the transmission rate of optical signal is implemented, the detection error of burst signal increases. Specifically, due to change in BER that arises when a speedup of the transmission rate of optical signal is implemented, the S/N ratio that is a ratio between a signal and a noise decreases, and the detection error of burst signal increases. FIG. 22 is a schematic diagram for explaining a burst-signal detection error with respect to each transmission rate. FIG. 22 is a table in which a transmission rate is associated with a minimum reception-level requirement (ITU-T), a BER requirement, an S/N ratio, and a burst-signal detection error.

As depicted in FIG. 22, when a "transmission rate" is "1.2 G", "S/N ratio: 14.2, burst-signal detection error: 7.0%", and "minimum reception-level requirement (ITU-T): −28.0 dBm, BER requirement: <$10^{-12}$". On the other hand, where "minimum reception-level requirement (ITU-T): −28.0 dBm, BER requirement: <$10^{-3}$", and a "transmission rate: 10 G", "S/N ratio: 4.8", and "burst-signal detection error: 20.8%". Accordingly, when implementing a speedup of the transmission rate of optical signal, the detection error of burst signal is increased, and the detection precision is deteriorated.

As described above, when implementing a speedup of the transmission rate of optical signal, the detection precision of burst signal is deteriorated due to various factors. A case of solving the above problem by inserting an amplifier in a former process to a burst signal detector and amplifying the amplitude of a burst signal is explained below. FIG. 23 is an explanatory diagram for explaining burst-signal detection according to a conventional technology.

"Burst signal" depicted in FIG. 23 denotes a signal input into the burst-signal receiver. Moreover, "amplitude detection level and code identifying threshold" denote an amplitude detection level for detecting an input signal, and a code identifying threshold for identifying a code of a burst signal and removing a noise. Moreover, "amplitude detection level and code identifying threshold (after amplification of prebias area)" indicate an amplitude detection level and a code identifying threshold after the prebias area of the burst signal is amplified by the amplifier.

As depicted in FIG. 23, a burst signal includes a data area in which data is converted into a signal, and a prebias area that comes prior to the data area. When a signal is input, the burst signal receiver then detects the upper-end level of a signal amplitude as an amplitude detection level, and distinguishes whether the input signal is a burst signal. Moreover, the burst signal receiver creates a code identifying threshold equivalent to a half of the detected amplitude detection level.

Here, suppose the amplitude of a burst signal is amplified by the amplifier in order to solve the above-described problem. In the case described above, although an amplitude detection level for detecting a burst signal turns high, simultaneously a noise is also amplified, and detected signal quality is deteriorated.

SUMMARY

According to an aspect of an embodiment of the invention, an optical communication method includes: outputting an optical data signal in which a signal amplitude of a non-data area that is an area other than a data area is made higher than a signal amplitude of the data area, to a predetermined receiver; receiving an optical input including the optical data signal output in the outputting, with the predetermined receiver; detecting each of the signal amplitude of the non-data area and the signal amplitude of the data area of the optical input received in the receiving; creating a threshold for encoding the data area based on the signal amplitude of the data area detected in the detecting; determining whether the optical data signal is received, based on the signal amplitude of the non-data area detected in the detecting; and outputting a data signal in which the data area is encoded by using the threshold of the optical data signal created in the creating, when it is determined in the determining that the optical data signal is received.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings. The embodiments are explained below by using an optical communication system that implements the optical communication method disclosed by the present application.

[a] First Embodiment

Figure 1:
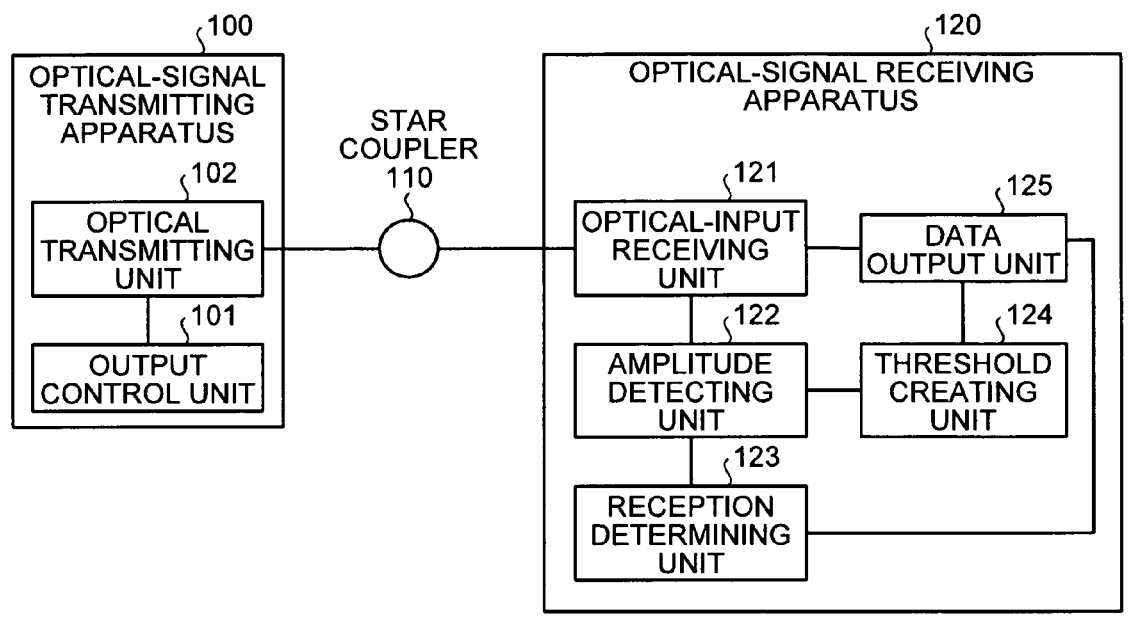
FIG. 1 is an explanatory diagram for explaining a configuration of an optical communication system according to a first embodiment of the present invention.

First of all, a configuration of the optical communication system according to an embodiment of the present invention is explained below. FIG. 1 is an explanatory diagram for explaining a configuration of the optical communication system according to a first embodiment of the present invention. As depicted in FIG. 1, the optical communication system includes an optical-signal transmitting apparatus 100 and an optical-signal receiving apparatus 120; and the optical-signal transmitting apparatus 100 and the optical-signal receiving apparatus 120 are coupled to each other via a star coupler 110. Although only one unit of the optical-signal transmitting apparatus 100 is depicted in FIG. 1, a plurality of the optical-signal transmitting apparatuses 100 is coupled to the optical-signal receiving apparatus 120 via the star coupler 110 in practice.

The star coupler 110 is a relay that multiplexes or branches optical signals transmitted and received between the optical-signal transmitting apparatus 100 and the optical-signal receiving apparatus 120. As depicted in FIG. 1, the optical-signal transmitting apparatus 100 includes an optical transmitting unit 102 and an output control unit 101; and transmits a data signal to the optical-signal receiving apparatus 120 via the star coupler 110.

The output control unit 101 controls the signal amplitude of a non-data area that is an area other than a data area to be higher than the signal amplitude of a data area. The optical transmitting unit 102 outputs an optical data signal of which the signal amplitude of the non-data area and the signal amplitude of the data area are controlled by the output control unit 101, to the optical-signal receiving apparatus 120.

As depicted in FIG. 1, the optical-signal receiving apparatus 120 includes an optical-input receiving unit 121, an amplitude detecting unit 122, a reception determining unit 123, a threshold creating unit 124, and a data output unit 125; and receives data signal transmitted by the optical-signal transmitting apparatus 100. The optical-input receiving unit 121 receives an optical input including an optical data signal output by the optical transmitting unit 102.

The amplitude detecting unit 122 detects each of the signal amplitude of the non-data area and the signal amplitude of the data area from the optical output received by the optical-input receiving unit 121. The reception determining unit 123 determines whether an optical data signal is received based on the signal amplitude of the non-data area detected by the amplitude detecting unit 122.

The threshold creating unit 124 creates a threshold for encoding the data area based on the signal amplitude of the data area detected by the amplitude detecting unit 122. When the reception determining unit 123 determines that an optical data signal is received, the data output unit 125 outputs a data signal of which the data area is encoded by using the threshold of the optical data signal created by the threshold creating unit 124.

As described above, according to the first embodiment, detection of a signal and creation of a code identifying threshold can be performed from a burst signal of which only the signal amplitude of a prebias area is amplified, and precision of signal detection of a burst signal can be increased without deterioration in detected signal quality.

[b] Second Embodiment

Configuration of Optical Communication System According to Second Embodiment

Figure 2:
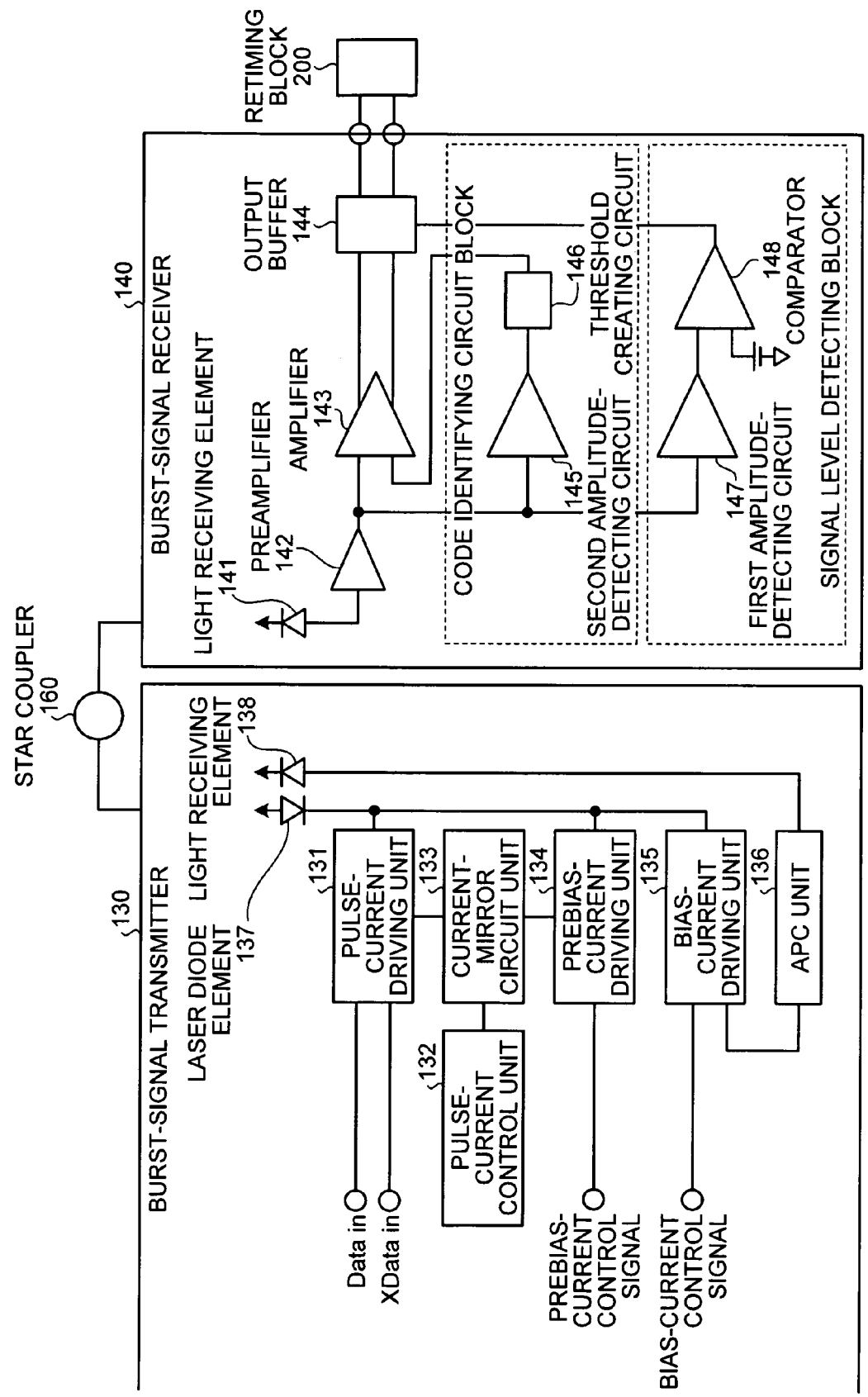
FIG. 2 is an explanatory diagram for explaining a configuration of an optical communication system according to a second embodiment of the present invention.
Figure 16:
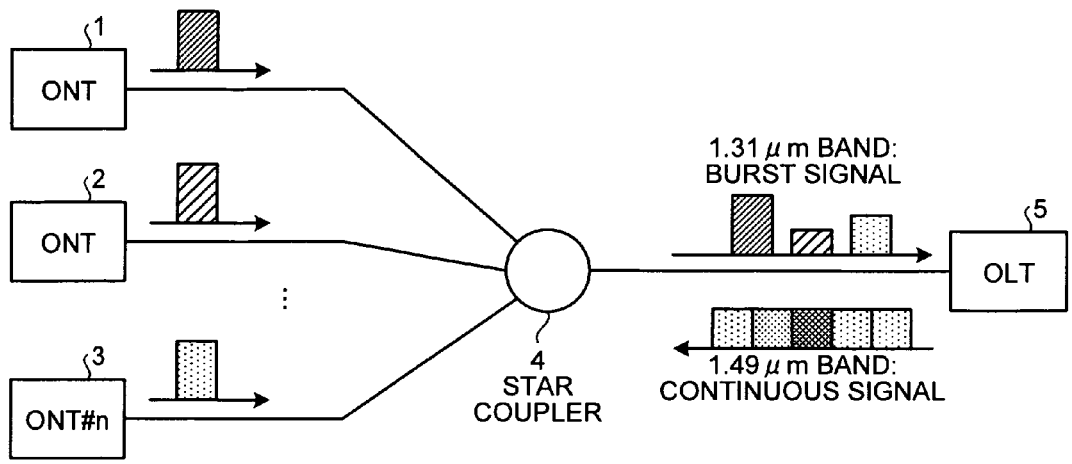
FIG. 16 is an explanatory diagram for explaining an example of a configuration of Fiber To The X (FTTX)
Figure 17:
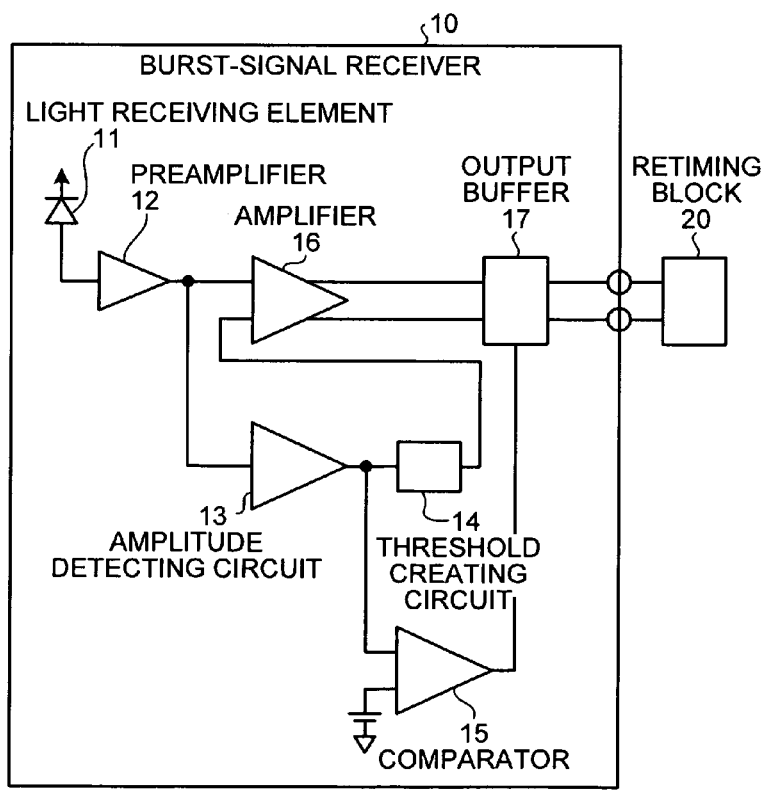
FIG. 17 is an explanatory diagram for explaining a burst signal receiver.
Figures 18, 19:
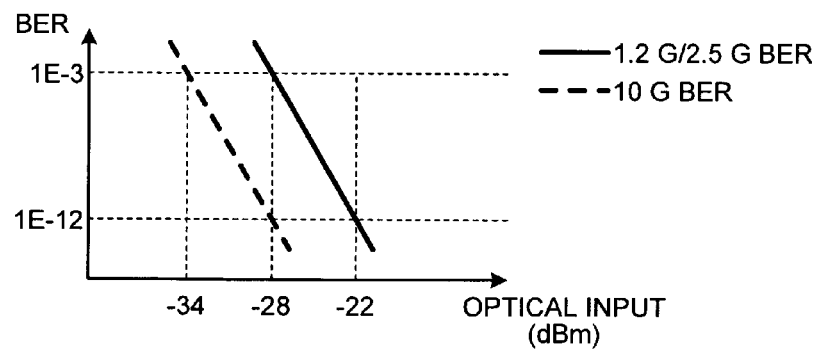
FIG. 18 is an explanatory diagram for explaining a Trans Impedance Amplifier (TIA) transimpedance ratio with respect to each transmission rate.
FIG. 19 is an explanatory diagram for explaining a bit error rate (BER) property.
Figure 20:
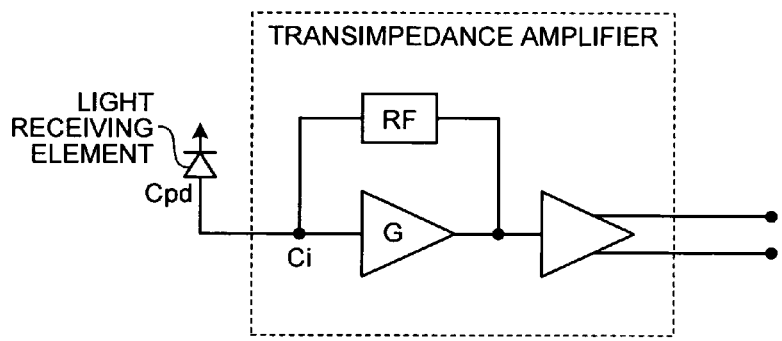
FIG. 20 is an explanatory diagram for explaining a cutoff frequency of a TIA.
Figure 21:
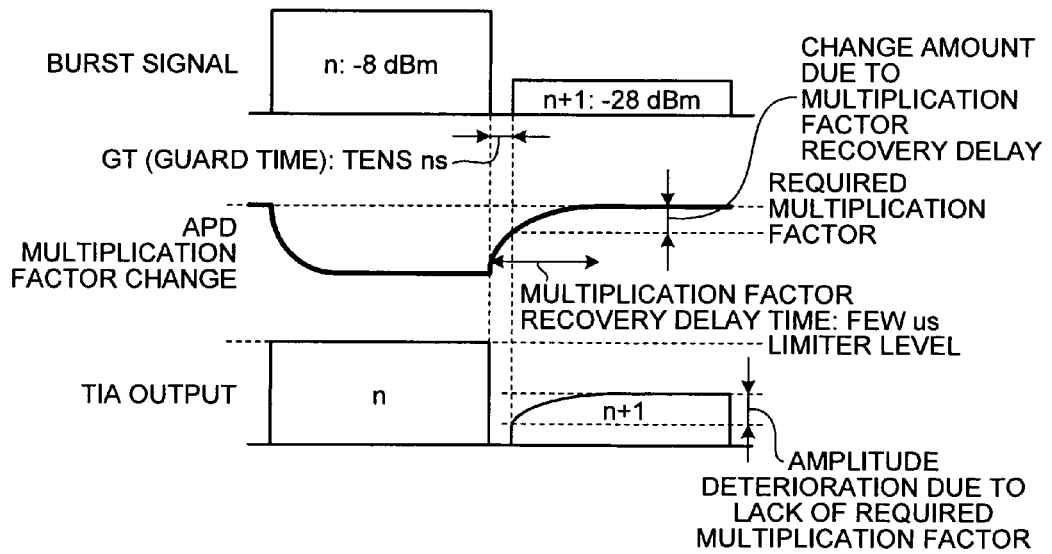
FIG. 21 is an explanatory diagram for explaining deterioration in an amplitude of a burst signal.

Then, a configuration of an optical communication system according to a second embodiment of the present invention is explained below with reference to FIGS. 2 to 4. FIG. 2 is an explanatory diagram for explaining a configuration of the optical communication system according to the second embodiment. As depicted in FIG. 2, the optical communication system includes a burst-signal transmitter 130 and a burst-signal receiver 140, which are coupled to each other via a star coupler 160. Although only one unit of the burst-signal transmitter 130 is depicted in FIG. 2, a plurality of burst-signal transmitters 130 is coupled to the burst-signal receiver 140 via the star coupler 160 in practice. For example, the burst-signal transmitter 130 and the burst-signal receiver 140 depicted in FIG. 2 are incorporated in an optical network terminal (ONT) and an optical line terminal (OLT), respectively (see FIG. 16).

The star coupler 160 is a relay that multiplexes or branches burst signals transmitted and received between the burst-signal transmitter 130 and the burst-signal receiver 140. The burst-signal transmitter 130 includes a pulse-current driving unit 131, a pulse-current control unit 132, a current-mirror circuit unit 133, a prebias-current driving unit 134, a bias-current driving unit 135, and an automatic power control (APC) unit 136, as depicted in FIG. 2. Moreover, as depicted in FIG. 2, the burst-signal transmitter 130 includes a laser diode element 137 and a light receiving element 138, and transmits a burst signal to the burst-signal receiver via the star coupler 160.

The pulse-current driving unit 131 converts a data signal input from "Data in" and "Xdata in" depicted in FIG. 2 into a current, and drives the laser diode element 137, which will be described later. Specifically, the pulse-current driving unit 131 converts the amplitude of the data area of a burst signal into a modulated current, and outputs the converted modulated current to the laser diode element 137. The pulse-current control unit 132 controls the amount of pulse current for driving the laser diode element, which will be described later.

The bias-current driving unit 135 drives the laser diode element 137 with a bias current such that a burst signal is output at an appropriate level from the laser diode element 137 described later, based on a bias-current control signal depicted in FIG. 2 and a signal from the APC unit 136. The APC unit 136 outputs a difference between a current signal received from the light receiving element 138 described later, and a reference signal for stabilizing optical output power, to the bias-current driving unit 135. The light receiving element 138 receives an optical signal output from the laser diode element 137 described later, and converts the received optical signal into a current, and outputs the current to the APC unit 136.

The current-mirror circuit unit 133 controls a ratio between an output of a first area and an output of a second area of a burst signal such that the output of the first area of the burst signal is to be output higher than the output of the second area of the burst signal. Specifically, the current-mirror circuit unit 133 controls the amount of pulse current controlled by the pulse-current control unit 132 such that a current output from the pulse-current driving unit 131 and a current output from the prebias-current driving unit 134 described later have a certain ratio.

The prebias-current driving unit 134 outputs a current for outputting a signal of the prebias area of a burst signal to the laser diode element 137 described later, based on a prebias-current control signal depicted in FIG. 2 and the amount of current input from the current-mirror circuit unit 133.

The laser diode element 137 outputs a burst signal of which an output of the first area and an output of the second area are changed as controlled by the current-mirror circuit unit 133, to the burst-signal receiver 140. Specifically, the laser diode element 137 outputs an optical signal corresponding to a pulse current input from the pulse-current driving unit 131, as a signal of the data area of the burst signal. Moreover, the laser diode element 137 outputs an optical signal corresponding to a current input from the prebias-current driving unit 134, as a signal of the prebias area of the burst signal. Furthermore, the laser diode element 137 outputs an optical signal corresponding to a current input from the bias-current driving unit 135, as a signal of the bias area of the burst signal.

A case where the burst-signal transmitter described above transmits a burst signal of which an output level of the prebias area is at K times of an output level of the data area is explained below with reference to FIG. 3. FIG. 3 is an explanatory diagram for explaining the burst-signal transmitter according to the second embodiment. "Transmission data" depicted in FIG. 3 denotes data input into the pulse-current driving unit 131; "bias-current control signal" denotes a signal input into the bias-current driving unit 135; and "prebias-current control signal" denotes a signal input into the prebias-current driving unit 134. Moreover, "pulse current" denotes a modulated signal (Imod) output from the pulse-current driving unit 131; "bias current" denotes a current output from the bias-current driving unit 135; and "prebias current" denotes a current output from the prebias-current driving unit 134. Furthermore, "optical output" denotes a burst signal output from the laser diode element 137.

Figure 3:
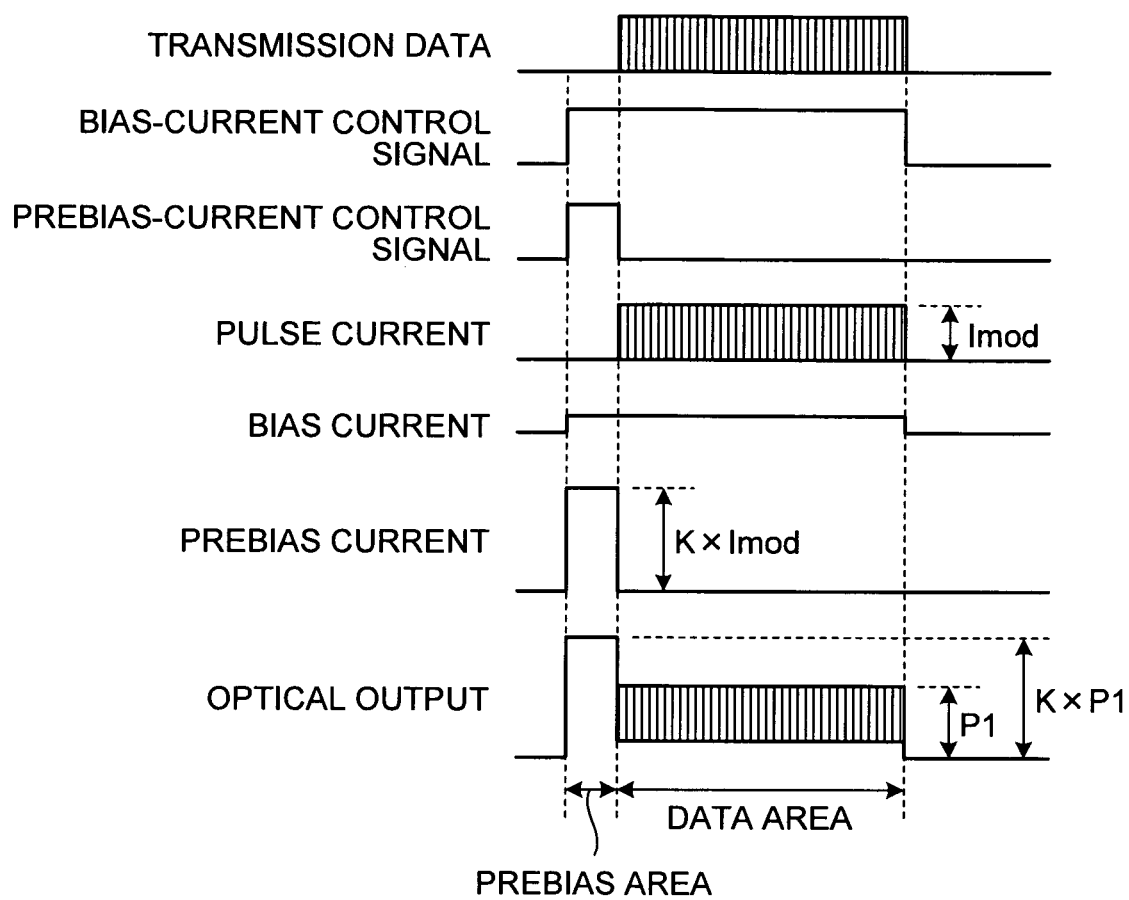
FIG. 3 is an explanatory diagram for explaining a burst-signal transmitter according to the second embodiment.

As depicted in FIG. 3, when transmission data, a bias-current control signal, and a prebias-current control signal are input, the pulse-current driving unit 131 outputs a pulse current (Imod) corresponding to the data area of the burst signal. The bias-current driving unit 135 then outputs a bias current such that a burst signal is to be output at a certain output level. The prebias-current driving unit 134 then outputs a prebias current corresponding to the prebias area of the burst signal with the amount of current controlled by the current-mirror circuit unit 133 (K×Imod). The laser diode element 137 then transmits a burst signal of which the optical signal level of the data area is at "P1", and the optical signal level of the prebias area is at "K×P1", to the burst-signal receiver 140.

Returning to FIG. 2, the burst-signal receiver 140 is coupled to the burst-signal transmitter 130 via the star coupler 150, and coupled to a retiming block 200 that extracts a clock signal from the data area of a burst signal. The burst-signal receiver 140 includes a light receiving element 141, a preamplifier 142, an amplifier 143, and an output buffer 144, as depicted in FIG. 2. Moreover, the burst-signal receiver 140 includes a second amplitude-detecting circuit 145 and a threshold creating circuit 146 as a code identifying circuit block that creates a code identifying threshold for identifying a code of the data area of a burst signal and removing a noise. Furthermore, the burst-signal receiver 140 includes a first amplitude-detecting circuit 147 and a comparator 148 as a signal level detecting block that detects the signal level of a burst signal.

The light receiving element 141 receives an optical input including an optical data signal of which outputs of the non-data area and the data area are changed by the laser diode element 137. Specifically, the light receiving element 141 receives an optical input including a burst signal of which the signal level of the prebias area is output higher than the signal level of the data area by the laser diode element 137. The light receiving element 141 then converts the received optical input into a current.

The preamplifier 142 converts a current converted by the light receiving element 141 into a voltage. The amplifier 143 encodes a voltage converted by the preamplifier 142, based on a threshold created by the code identifying circuit block.

The first amplitude-detecting circuit 147 detects the signal amplitude of the non-data area of the optical input received by the light receiving element 141. Specifically, the first amplitude-detecting circuit 147 detects the signal level of the prebias area of the optical input received by the light receiving element 141.

The comparator 148 compares the signal level of the prebias area of an optical input detected by the first amplitude-detecting circuit 147 and a certain threshold that is predetermined. When the signal level of the prebias area of the optical input is higher than the certain threshold, the comparator 148 then outputs a signal to the output buffer 144 described later.

The second amplitude-detecting circuit 145 detects the signal amplitude of the data area of an optical input received by the light receiving element 141. Specifically, the second amplitude-detecting circuit 145 detects the signal level of the data area of an optical input received by the light receiving element 141.

The threshold creating circuit 146 creates a code identifying threshold for encoding the data area based on the signal amplitude of the data area detected by the second amplitude-detecting circuit 145. Specifically, the threshold creating circuit 146 creates a code identifying threshold equivalent to the value of a half of the upper-end value of the signal amplitude of the data area detected by the second amplitude-detecting circuit 145.

The output buffer 144 determines whether a burst signal is received based on the signal amplitude of the non-data area detected by the first amplitude-detecting circuit 147. Specifically, when a signal is received from the comparator 148, the output buffer 144 determines that a burst signal is received. When the output buffer 144 determines that a burst signal is received, the output buffer 144 outputs a burst signal that is encoded by using a code identifying threshold created by the threshold creating circuit 146. Specifically, when a signal is received from the comparator 148, the output buffer 144 outputs a burst signal encoded by the amplifier 143 to the retiming block 200.

A case where the burst-signal receiver described above receives a burst signal of which an output level of the prebias area is at k times of an output level of the data area is explained below with reference to FIG. 4. FIG. 4 is an explanatory diagram for explaining the burst-signal receiver according to the second embodiment. "Burst signal" depicted in FIG. 4 denotes a signal received from the burst-signal transmitter 130 via the star coupler 160, and "amplitude detection level 2 and code identifying threshold" denotes the level of amplitude detection by the second amplitude-detecting circuit 145 and threshold creation by the threshold creating circuit 146.

Figure 4:
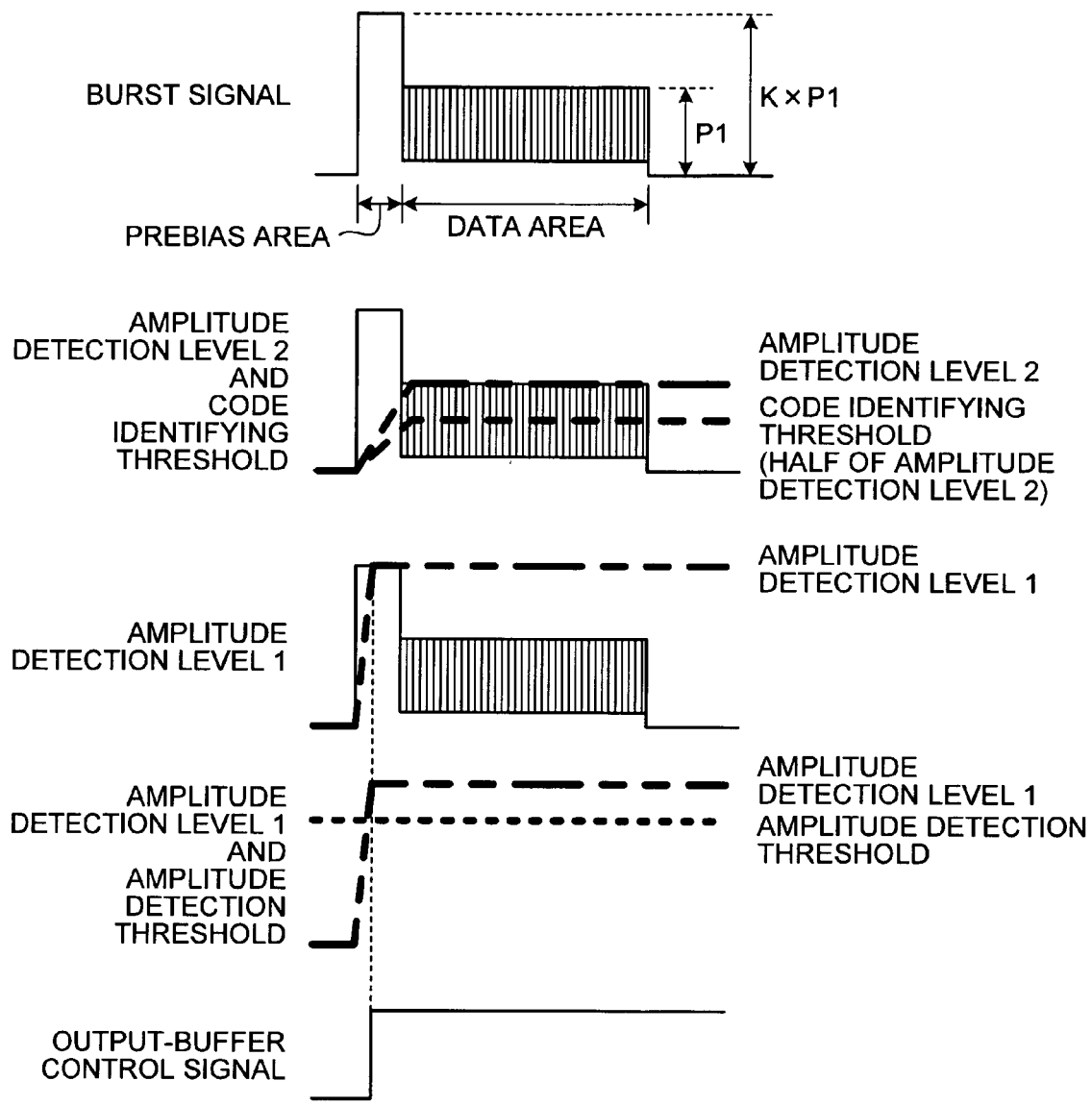
FIG. 4 is an explanatory diagram for explaining a burst-signal receiver according to the second embodiment.

Moreover, "amplitude detection level 1" depicted in FIG. 4 denotes the level of amplitude detection by the first amplitude-detecting circuit 147, and "amplitude detection level 1 and amplitude detection threshold" denotes a comparison between the level of amplitude detection by the first amplitude-detecting circuit 147 and the amplitude detection threshold. Furthermore, "output-buffer control signal" denotes a signal output from the comparator 148 when the level of amplitude detection by the first amplitude-detecting circuit 147 is higher than the amplitude detection threshold.

As depicted as a burst signal in FIG. 4, when receiving a burst signal of which an output level of the prebias area is at k times of an output level of the data area, the second amplitude-detecting circuit 145 detects the output level of the data area as the amplitude detection level 2. The threshold creating circuit 146 then creates a code identifying threshold equivalent to a half of the amplitude detection level detected by the second amplitude-detecting circuit 145.

Moreover, the first amplitude-detecting circuit 147 detects the output level of the prebias area as the amplitude detection level 1. The comparator 148 then compares the amplitude detection level 1 detected by the first amplitude-detecting circuit 147 and the amplitude detection threshold that is a threshold for distinguishing between a burst signal and a noise. When the amplitude detection level 1 detected by the first amplitude-detecting circuit 147 is higher than the amplitude detection threshold, the comparator 148 outputs an output-buffer control signal.

Procedure of Processing by Optical Communication System According to Second Embodiment Procedures of processing by the optical communication system according to the second embodiment are explained below with reference to FIGS. 5 and 6.

Figure 5:
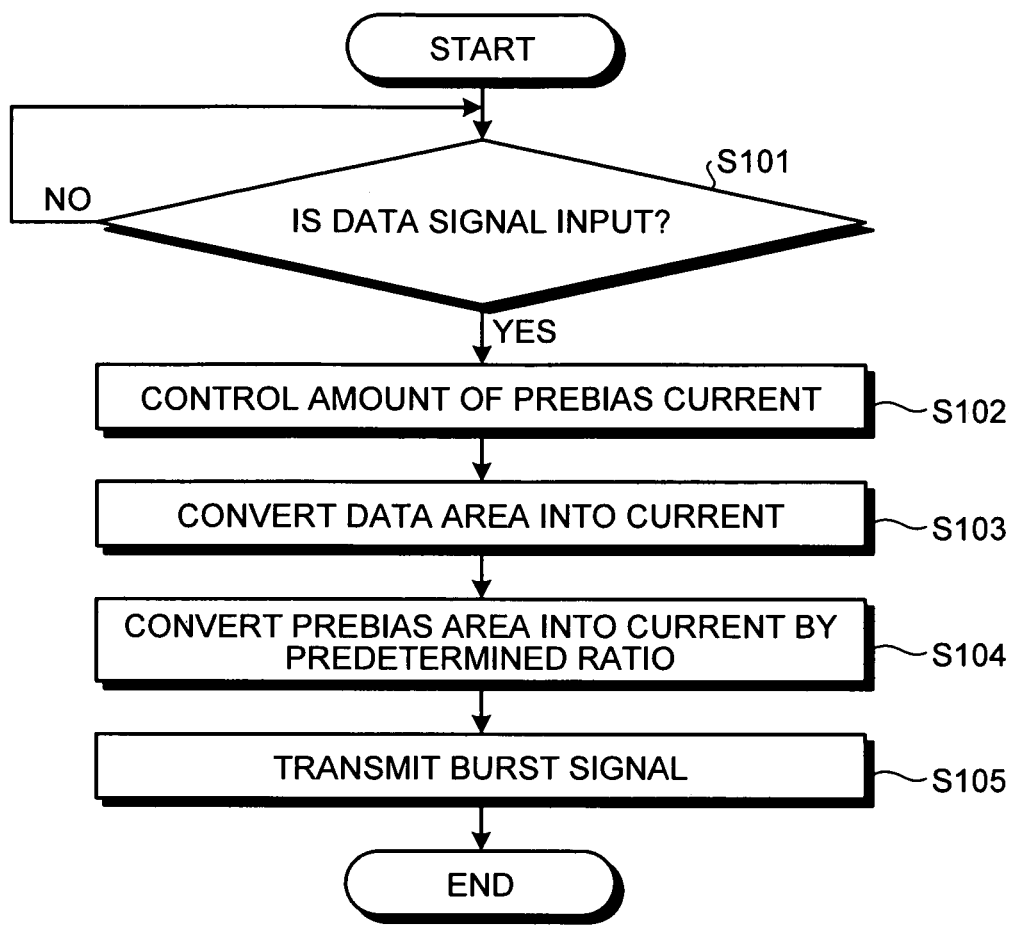
FIG. 5 is a schematic diagram for explaining a procedure of processing by the burst-signal transmitter according to the second embodiment.

Procedure of Processing by Burst-Signal Transmitter According to Second Embodiment FIG. 5 is a schematic diagram for explaining a procedure of processing by the burst-signal transmitter according to the second embodiment. As depicted in FIG. 5, to begin with, in the burst-signal transmitter 130, when a data signal is input (Yes at Step S101), the current-mirror circuit unit 133 controls the amount of prebias current (Step S102). The current-mirror circuit unit 133 controls the amount of prebias current such that a current output from the pulse-current driving unit 131 controlled by the pulse-current control unit 132 and a current output from the prebias-current driving unit 134 have a certain ratio (Step S102).

The pulse-current driving unit 131 then converts the data area into a current with the amount of pulse current controlled by the pulse-current control unit 132 via the current-mirror circuit unit 133 (Step S103). After that, the prebias-current driving unit 134 converts the prebias area of the burst signal into a current with a prebias driving current that is predetermined to the amount of pulse current controlled by the pulse-current control unit 132 (Step S104). The laser diode element 137 then transmits a burst signal based on a current input from the pulse-current driving unit 131 and the prebias-current driving unit 134 (Step S105), and terminates the processing.

Procedure of Processing by Burst-Signal Receiver According to Second Embodiment

Figure 6:
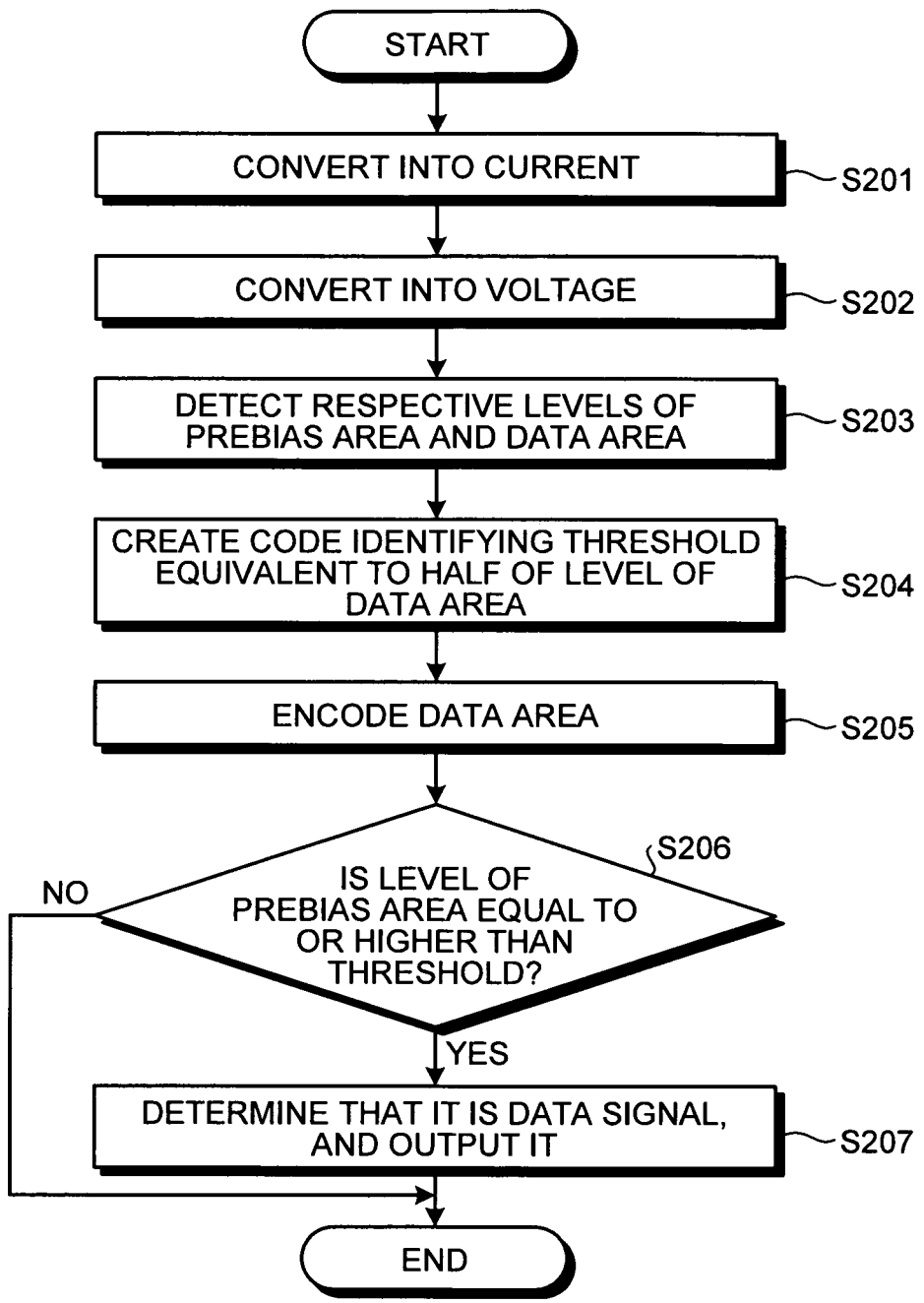
FIG. 6 is a schematic diagram for explaining a procedure of processing by the burst-signal receiver according to the second embodiment.

FIG. 6 is a schematic diagram for explaining a procedure of processing by the burst-signal receiver according to the second embodiment. As depicted in FIG. 6, to begin with, in the burst-signal receiver 140, when an optical input is received, the light receiving element 141 converts a received optical signal into a current (Step S201). The preamplifier 142 then converts the current input from the light receiving element 141 into a voltage (Step S202).

After that, the first amplitude-detecting circuit 147 and the second amplitude-detecting circuit 145 detect respective levels of the prebias area and the data area of a burst signal (Step S203). The threshold creating circuit 146 then creates a code identifying threshold equivalent to a half of the level of the data area detected by the second amplitude-detecting circuit 145 (Step S204). The amplifier 143 then encodes the data area by using the code identifying threshold created by the threshold creating circuit 146 (Step S205).

The output buffer 144 then determines whether the level of the prebias area detected by the first amplitude-detecting circuit 147 is equal to or higher than the threshold (Step S206). Specifically, the output buffer 144 determines whether the level of the prebias area is equal to or higher than the threshold, based on a signal input from the comparator 148.

If the level of the prebias area is equal to or higher than the threshold (Yes at Step S206); the output buffer 144 determines that the input burst signal is a data signal, outputs it to the retiming block 200 (Step S207), and terminates the processing. By contrast, if the level of the prebias area is lower than the threshold (No at Step S206); the output buffer 144 determines that the input burst signal is a noise, and terminates the processing.

Effect of Second Embodiment

As described above, according to the second embodiment, the current-mirror circuit unit 133 performs control such that an output of the prebias area of the burst signal is to be output higher than the output of the data area. The laser diode element 137 then outputs a burst signal to the burst-signal receiver 140 by changing an output of the prebias area and an output of the data area as controlled by the current-mirror circuit unit 133. The light receiving element 141 then receives the burst signal output by the laser diode element 137. The first amplitude-detecting circuit 147 then detects the signal amplitude of the prebias area; and the second amplitude-detecting circuit 145 detects the signal amplitude of the data area.

The threshold creating circuit 146 then creates a threshold for identifying code of the data area and removing a noise, based on the signal amplitude of the data area detected by the second amplitude-detecting circuit 145. The output buffer 144 then determines whether a burst signal is received based on the signal amplitude of the prebias area. Moreover, when the output buffer 144 determines that a burst signal is received, the output buffer 144 outputs to the retiming block 200 a data signal of which code is identified and a noise is removed by using the threshold created by the threshold creating circuit 146. Accordingly, signal detection of a burst signal of which only the signal amplitude of the prebias area is amplified and creation of a code identifying threshold can be performed, so that the precision of signal detection of burst signal can be improved without deterioration in signal detection quality.

Moreover, according to the second embodiment, the threshold creating circuit 146 creates a value of a half of the upper-end value of the signal amplitude of the second area detected by the second amplitude-detecting circuit 145 as a threshold. Accordingly, a conventional technology can be applied, and can be easily achieved.

Furthermore, according to the second embodiment, the current-mirror circuit unit 133 controls a ratio between an output of the first area and an output of the second area of a burst signal. Accordingly, output of the prebias area and the data area can be easily changed.

Figures 7, 8:
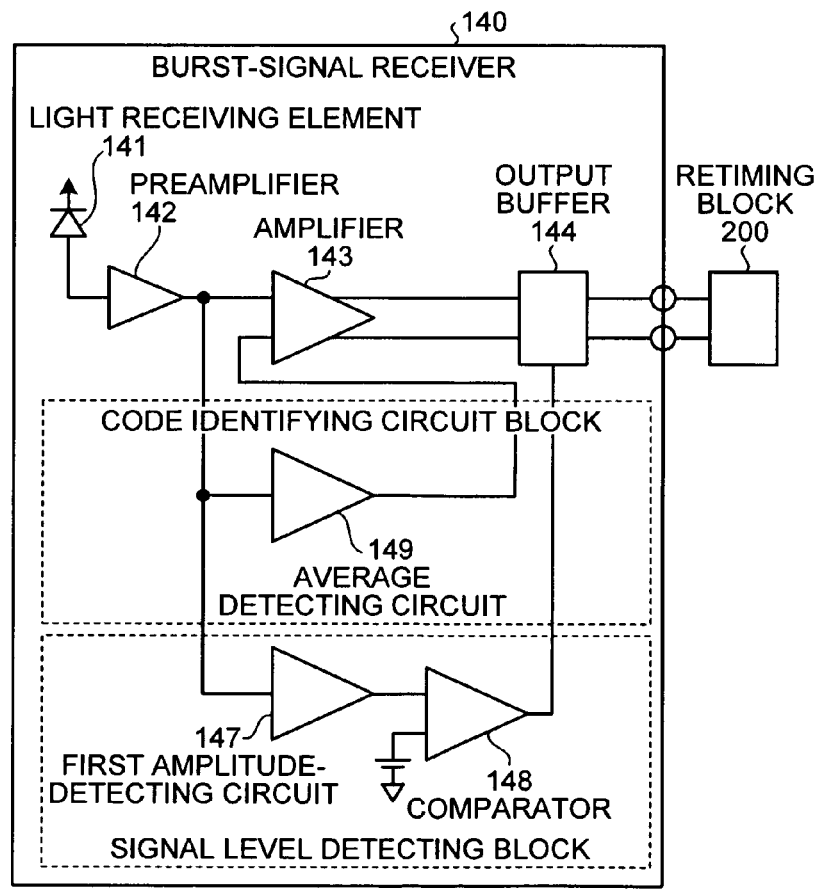
FIG. 7 is an explanatory diagram for explaining a burst-signal detection error.
FIG. 8 is an explanatory diagram for explaining a configuration of a burst-signal receiver according to a third embodiment of the present invention.

An improvement amount of burst-signal detection error where the output level of the prebias area is at two times of the output level of the data area is explained below. FIG. 7 is an explanatory diagram for explaining a burst-signal detection error. FIG. 7 is a table in which a transmission rate is associated with a minimum reception-level requirement (International Telecommunication Union Telecommunication Standardization Sector (ITU-T)), a bit error rate (BER) requirement, a signal-to-noise (S/N) ratio, and a burst-signal detection error.

Figures 22, 23:
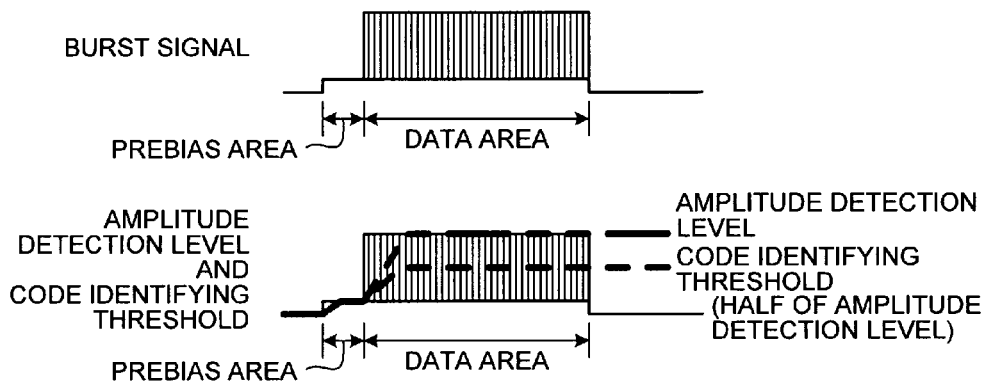
FIG. 22 is an explanatory diagram for explaining a burst-signal detection error with respect to each transmission rate.
FIG. 23 is an explanatory diagram for explaining burst-signal detection according to a conventional technology.

As depicted in FIG. 7, a "transmission rate: 1.2 G" leads to "S/N ratio: 14.2, burst-signal detection error (K=2): 3.5%", where "minimum reception-level requirement (ITU-T): −28.0 dBm, BER requirement: $<10^{-12}$". On the other hand, where "minimum reception-level requirement (ITU-T): −28.0 dBm, BER requirement: $<10^{-3}$", a "transmission rate: 10 G" leads to "S/N ratio: 4.8, burst-signal detection error (K=2): 10.4%". Compared with "burst-signal detection error (K=2): 20.8%" at the "transmission rate: 10 G" depicted in FIG. 22, an improvement by "10.4%" is observed in "burst-signal detection error (K=2): 10.4%" at the "transmission rate: 10 G" described above. Accordingly, the optical transmission system according to the embodiment can increase detection precision of burst signal without deterioration in signal quality.

[c] Third Embodiment

Although the second embodiment described above has explained a case of creating a code identifying threshold equivalent to a half of the signal amplitude of the data area, a third embodiment of the present invention explains below a case of creating a code identifying threshold equivalent to an average of the signal amplitude of the data area.

Configuration of Burst-Signal Receiver According to Third Embodiment

At first, a configuration of a burst-signal receiver according to the third embodiment is explained below with reference to FIG. 8. FIG. 8 is an explanatory diagram for explaining a configuration of the burst-signal receiver according to the third embodiment. As depicted in FIG. 8, the burst-signal receiver according to the third embodiment is different from the burst-signal receiver according to the second embodiment depicted in FIG. 2 only in the code identifying circuit block. In other words, the burst-signal receiver according to the third embodiment is different only in the point that the burst-signal receiver includes an average detecting circuit as a code identifying circuit block. The following description mainly explains this.

An average detecting circuit 149 creates an average of the signal amplitude of the second area as a threshold. Specifically, the average detecting circuit 149 continuously detects output amplitudes of a voltage converted by the preamplifier 142, and creates an average of the detected output amplitude as a code identifying threshold.

Figure 9:
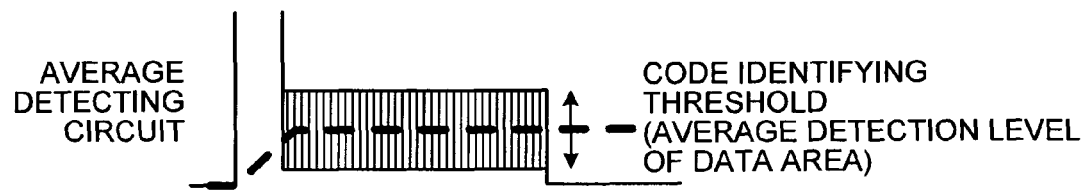
FIG. 9 is an explanatory diagram for explaining an average detecting circuit.

FIG. 9 is an explanatory diagram for explaining the average detecting circuit. As depicted in FIG. 9, the average detecting circuit 149 calculates an average by continuously detecting output amplitudes of the data area of burst signals, and creates a code identifying threshold equivalent to the calculated average detection level.

Procedure of Processing by Burst-Signal Receiver According to Third Embodiment

Figure 10:
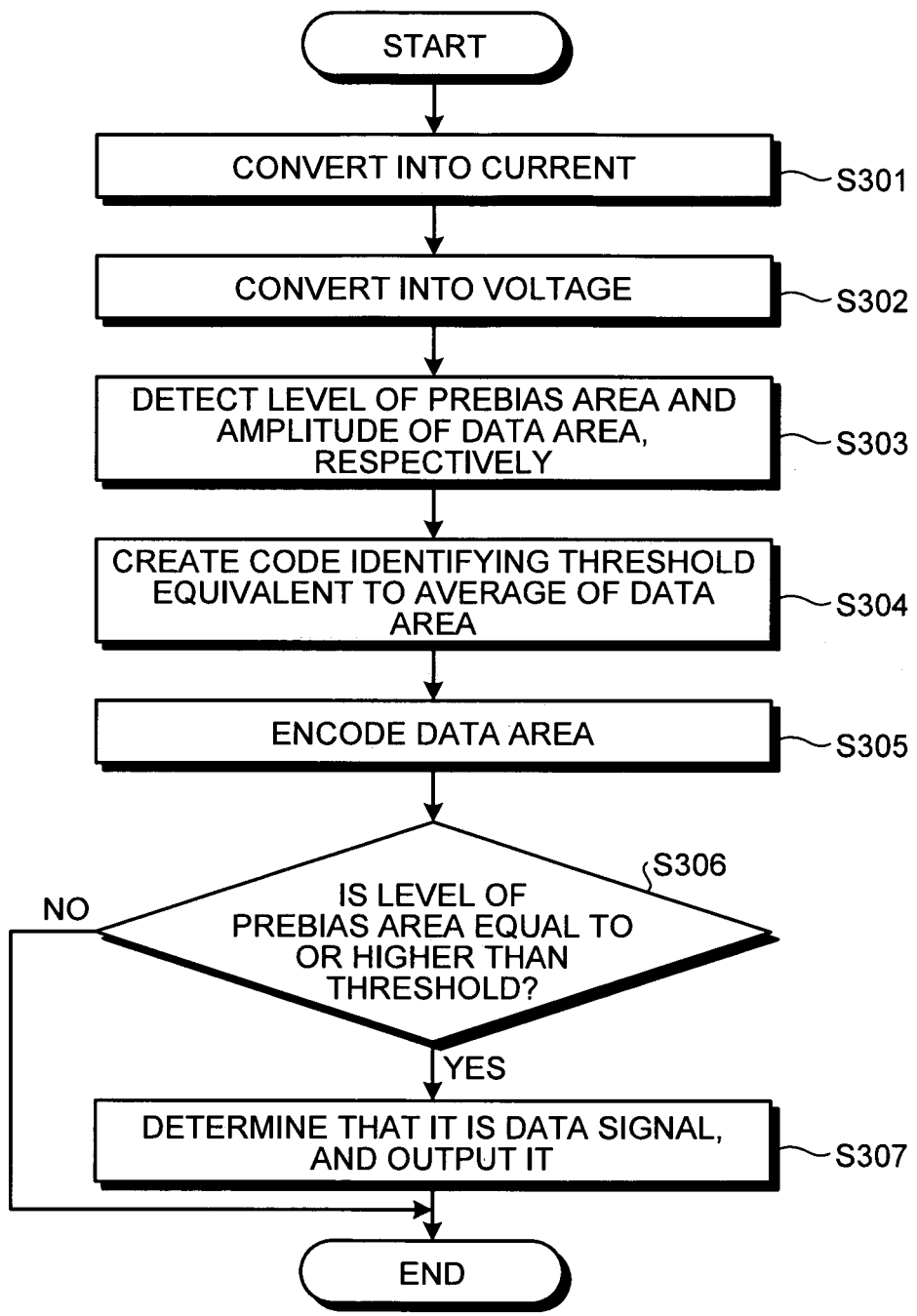
FIG. 10 is a schematic diagram for explaining a procedure of processing by the burst-signal receiver according to the third embodiment.

Then, a procedure of processing by the burst-signal receiver according to the third embodiment is explained below. FIG. 10 is a schematic diagram for explaining a procedure of processing by the burst-signal receiver according to the third embodiment. Steps S301 to S303, and Steps S305 to S307 depicted in FIG. 6 are the same processes as Steps S201 to S203, and Steps S205 to S207 depicted in FIG. 6, therefore, detailed explanations are omitted.

As depicted in FIG. 10, in the burst-signal receiver 140, after a received burst signal is converted into a voltage, and the amplitudes of the prebias area and the data area are detected (Steps S301 to S303), an average of the data area is created as a code identifying threshold (Step S304).

Specifically, the average detecting circuit 149 continuously detects output amplitudes of a voltage converted by the preamplifier 142, and creates an average of the detected output amplitudes as a code identifying threshold. The burst-signal receiver 140 then determines the burst signal based on the level of the prebias area, and outputs the burst signal only when it is determined that the burst signal is a data signal (Steps S305 to S307).

Effects of Third Embodiment

As described above, according to the third embodiment, the average detecting circuit 149 creates an average of the upper-end value and the lower-end value of detected signal amplitudes of the second area as a threshold. Accordingly, a threshold for which the upper-end value and the lower-end value of the signal amplitude are considered can be created, so that code identification with high precision can be performed.

[d] Fourth Embodiment

The second and third embodiments described above have explained cases of creating a code identifying threshold equivalent to a half or an average of the signal amplitude of the data area. A fourth embodiment of the present invention explains below a case of creating a code identifying threshold based on a ratio between the level of the prebias area and the level of the data area.

Configuration of Burst-Signal Receiver According to Fourth Embodiment

Figure 11:
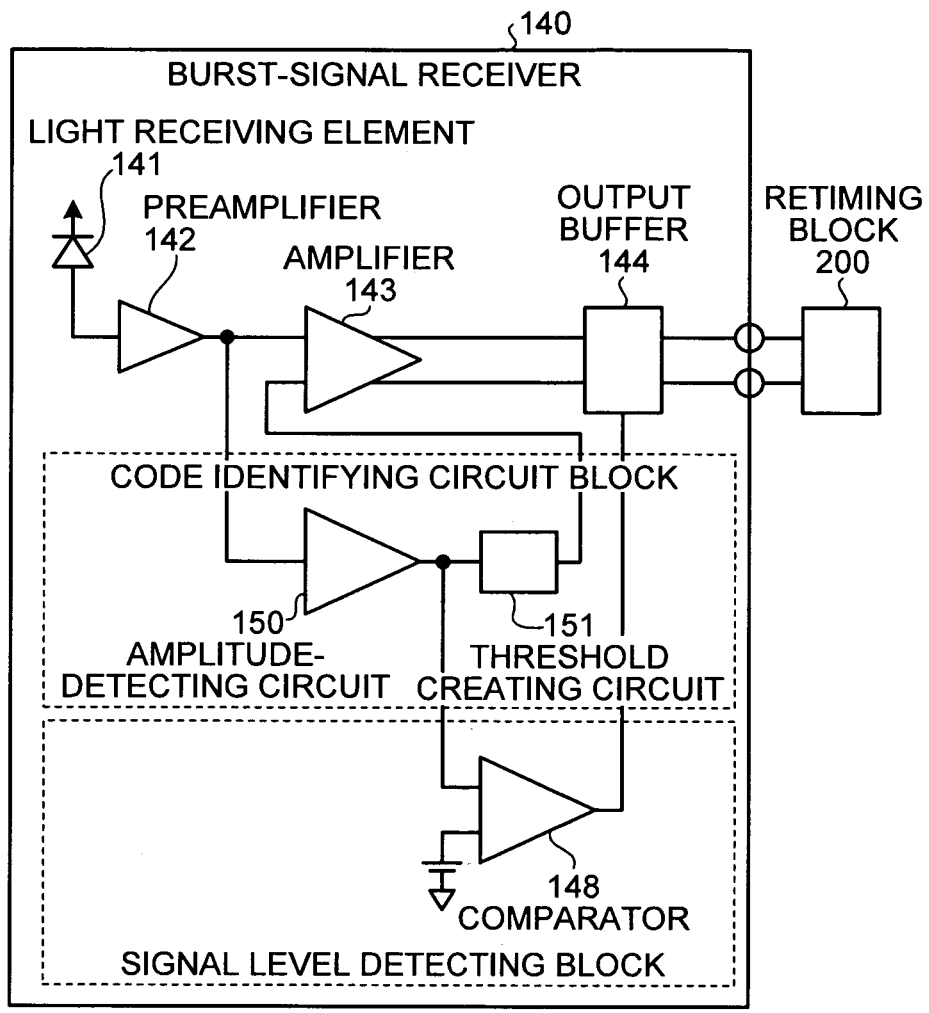
FIG. 11 is an explanatory diagram for explaining a configuration of a burst-signal receiver according to a fourth embodiment of the present invention.

First of all, a configuration of the burst-signal receiver according to the fourth embodiment is explained below with reference to FIG. 11. FIG. 11 is an explanatory diagram for explaining a configuration of the burst-signal receiver according to the fourth embodiment. As depicted in FIG. 11, the burst-signal receiver according to the fourth embodiment is different from the burst-signal receiver according to the second embodiment depicted in FIG. 2 in the point that an amplitude detecting circuit is a single unit, and processing details of the threshold creating circuit are different. The following description mainly explains this.

An amplitude detecting circuit 150 performs the same processing as the first amplitude-detecting circuit 147 according to the second and third embodiments. In other words, the amplitude detecting circuit 150 detects the signal amplitude of the first area of a burst signal received by the light receiving element 141. Specifically, the first amplitude-detecting circuit 147 detects the signal level of the prebias area of a burst signal received by the light receiving element 141.

A threshold creating circuit 151 calculates the signal amplitude of the data area from the signal amplitude of the non-data area detected by the amplitude detecting circuit 150, based on a ratio between an output of the non-data area and an output of the data area controlled by the current-mirror circuit unit 133. The threshold creating circuit 151 then creates a code identifying threshold from the signal amplitude of the calculated data signal.

Figure 12:
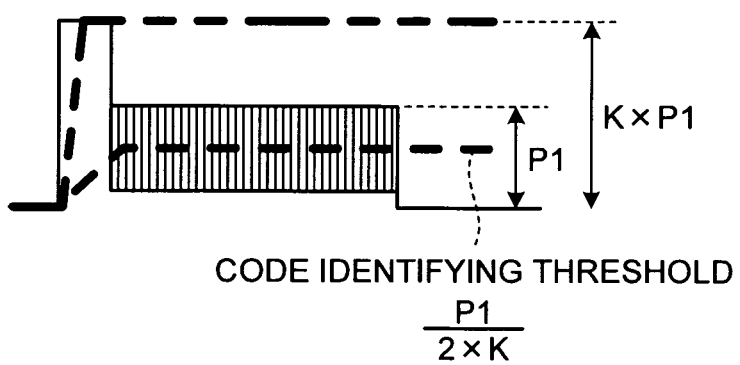
FIG. 12 is an explanatory diagram for explaining a threshold creating circuit according to the fourth embodiment.

FIG. 12 is an explanatory diagram for explaining the threshold creating circuit according to the fourth embodiment. For example, as depicted in FIG. 12, when a ratio is set by the current-mirror circuit unit 133 to "level of data area: level of prebias area, 1:k", the threshold creating circuit 151 creates "P1/2K" as a code identifying threshold.

Procedure of Processing by Burst-Signal Receiver According to Fourth Embodiment

Figure 13:
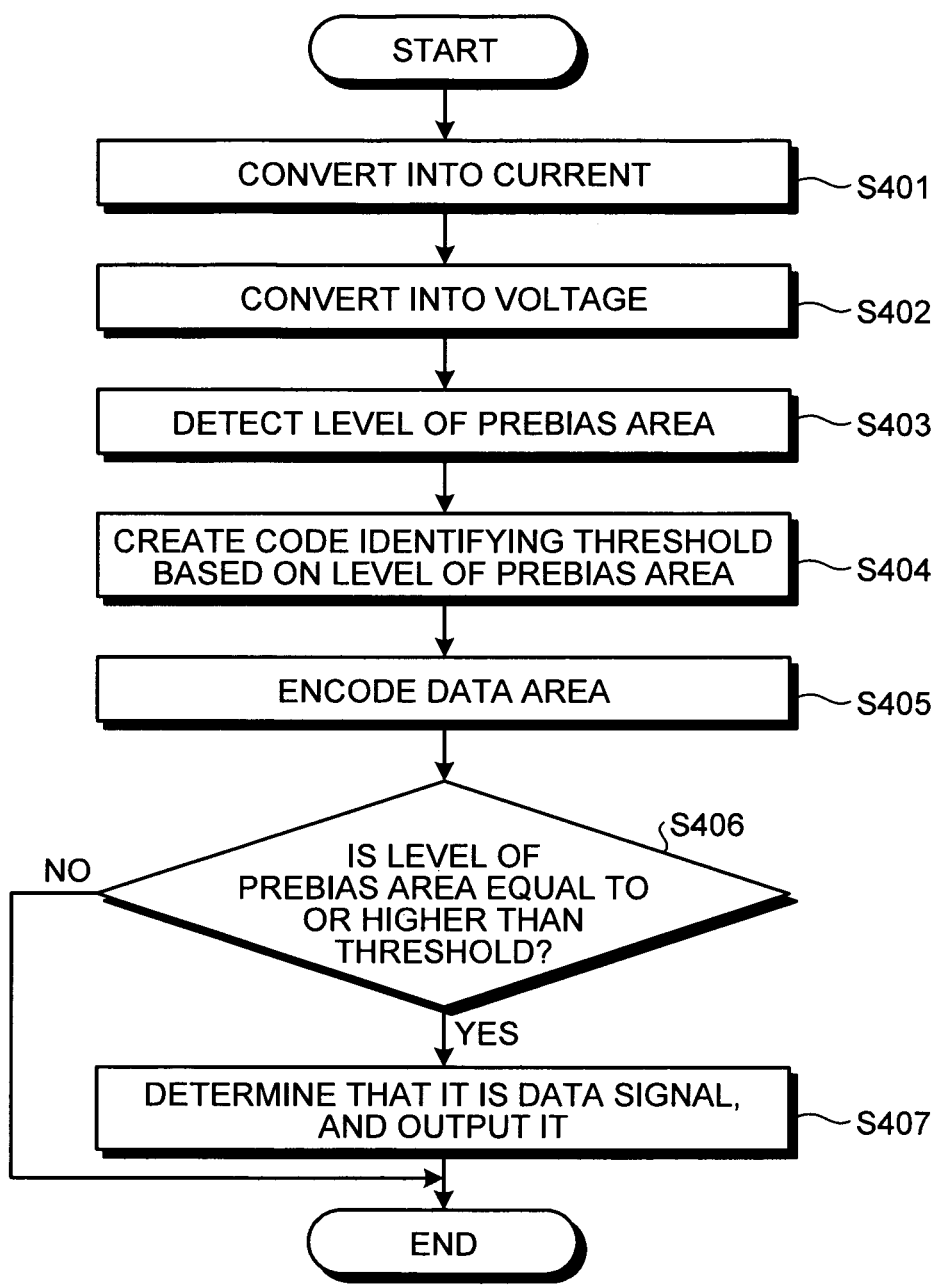
FIG. 13 is a schematic diagram for explaining a procedure of processing by the burst-signal receiver according to the fourth embodiment.

Then, a procedure of processing by the burst-signal receiver according to the fourth embodiment is explained below. FIG. 13 is a schematic diagram for explaining a procedure of processing by the burst-signal receiver according to the fourth embodiment. Steps S401 to S402, and Steps S405 to S407 depicted in FIG. 13 are the same processes as Steps S201 to S202, and Steps S205 to S207 depicted in FIG. 6, therefore, detailed explanations are omitted.

As depicted in FIG. 13, in the burst-signal receiver 140, after a received burst signal is converted into a voltage (Steps S401 to S402), the amplitude detecting circuit 150 detects the level of the prebias area (Step S403). The threshold creating circuit 151 then calculates an amplitude of the data area based on the amplitude of the prebias area detected by the amplitude detecting circuit 150, creates a code identifying threshold from the amplitude of the calculated data area (Step S404).

Specifically, the amplitude detecting circuit 150 creates a code identifying threshold based on a ratio between the signal level of the data area and the signal level of the prebias area that is set by the current-mirror circuit unit 133. The burst-signal receiver 140 then encodes the data area, determines a burst signal based on the level of the prebias area, and then outputs the burst signal only when it is determined that the burst signal is a data signal.

Effects of Fourth Embodiment

As described above, according to the fourth embodiment, the threshold creating circuit 151 creates a threshold from the signal amplitude of the first area detected by the amplitude detecting circuit 150, based on a ratio between an output of the prebias area and an output of the data area that is controlled by the current-mirror circuit unit 133. Accordingly, determination of reception and creation of threshold can be performed only by detecting the signal amplitude of the prebias area.

[e] Fifth Embodiment

Although the second embodiment described above has explained a case of controlling the prebias area by using the current-mirror circuit; a fifth embodiment of the present invention explains below a case of controlling the prebias area from information about a pulse current.

Configuration of Burst-Signal Transmitter According to Fifth Embodiment

Figure 14:
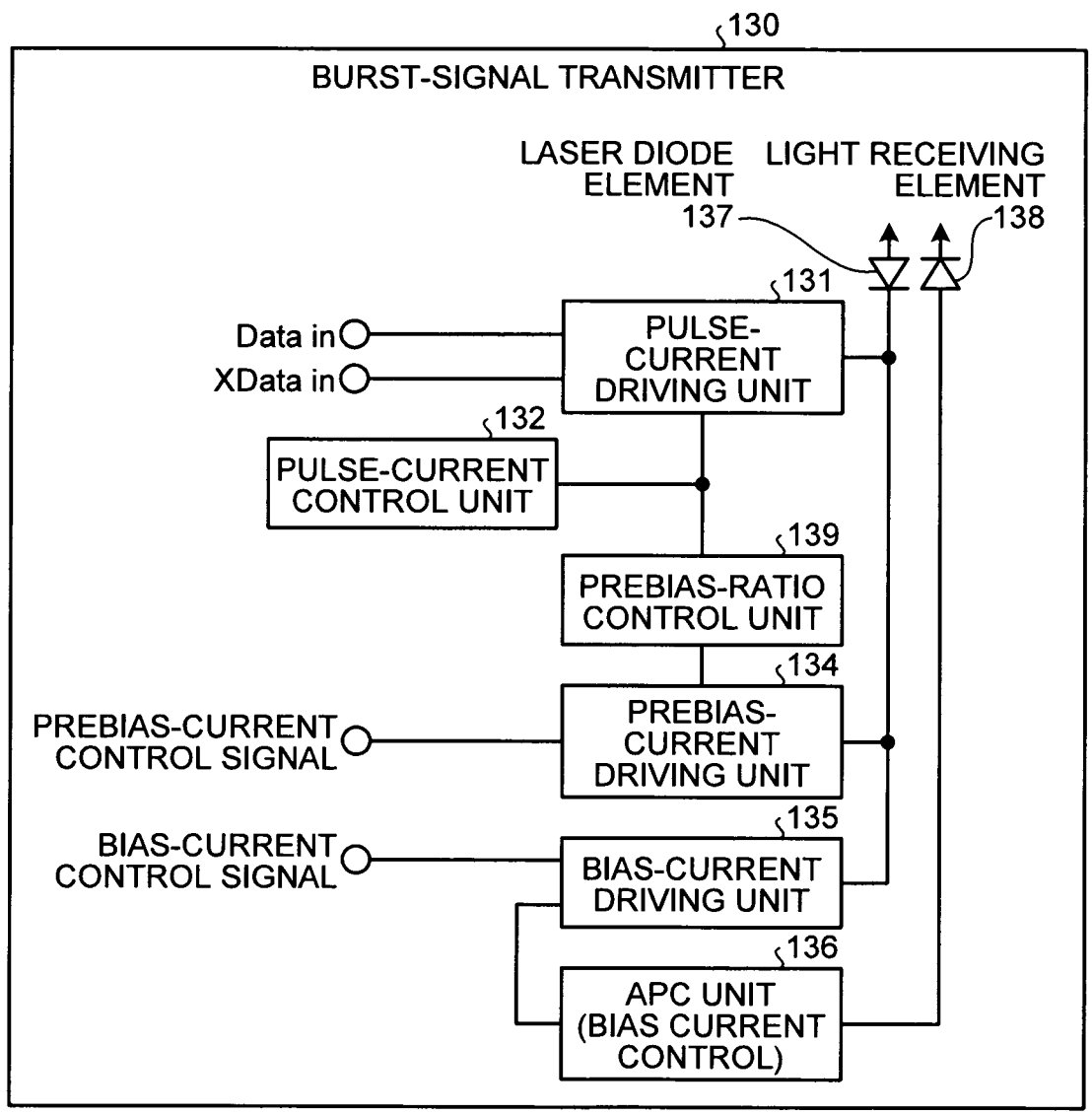
FIG. 14 is an explanatory diagram for explaining a configuration of a burst-signal transmitter according to a fifth embodiment of the present invention.

At first, a configuration of a burst-signal transmitter according to the fifth embodiment is explained below with reference to FIG. 14. FIG. 14 is an explanatory diagram for explaining a configuration of the burst-signal transmitter according to the fifth embodiment. As depicted in FIG. 14, the burst-signal transmitter according to the fifth embodiment is different from the burst-signal transmitter according to the second embodiment depicted in FIG. 2 in the point that the burst-signal transmitter includes a prebias-ratio control unit 139 instead of the current-mirror circuit unit 133. The following description mainly explains this.

The prebias-ratio control unit 139 controls a ratio of output of the non-data area based on output control information about the data area of a burst signal. Specifically, the prebias-ratio control unit 139 performs control such that a current at a certain ratio to the pulse current controlled by the pulse-current control unit 132 is to be output from the prebias-current driving unit 134. For example, the prebias-ratio control unit 139 performs control such that a current of k times of the amount of current controlled by the pulse-current control unit 132 is to be output from the prebias-current driving unit.

Figure 15:
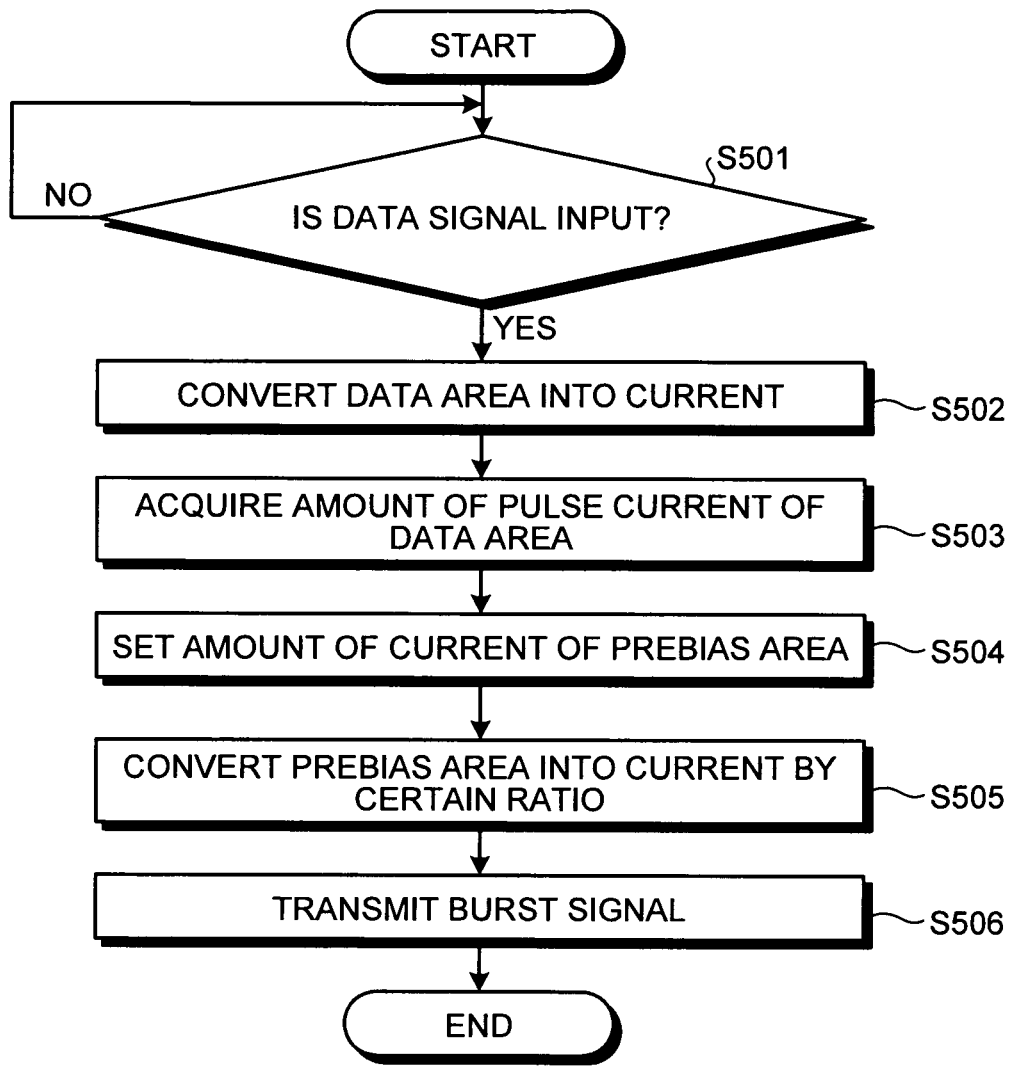
FIG. 15 is a schematic diagram for explaining a procedure of processing by the burst-signal transmitter according to the fifth embodiment.

Procedure of Processing by Burst-Signal Transmitter According to Fifth Embodiment Then, a procedure of processing by the burst-signal transmitter according to the fifth embodiment is explained below. FIG. 15 is a schematic diagram for explaining a procedure of processing by the burst-signal transmitter according to the fifth embodiment. As depicted in FIG. 15, in the burst-signal transmitter 130 according to the fifth embodiment, when a data signal is input (Yes at Step S501); the pulse-current driving unit 131 converts the data area into a current (Step S502).

The prebias-ratio control unit 139 then acquires the amount of pulse current of the data area controlled by the pulse-current control unit 132 (Step S503); and sets the amount of current of the prebias area (Step S504). After that, the prebias-current driving unit 134 converts the prebias area of the burst signal into a current by a certain ration with the amount of current set by the prebias-ratio control unit 139 (Step S505). The laser diode element 137 then transmits the burst signal based on the currents input from the pulse-current driving unit 131 and the prebias-current driving unit 134 (Step S506), and then terminates the processing.

Effect of Fifth Embodiment

As described above, according to the fifth embodiment, the prebias-ratio control unit 139 controls the ratio of output of the prebias area based on output control information about the data area of a burst signal. Accordingly, an output of the prebias area can be determined only by monitoring an output of the data area, and achieved more easily.

According to the disclosed methods, signal detection precision of burst signal can be increased without deterioration in detected signal quality.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical communication method comprising:
    transmitting an optical data signal to a predetermined receiver, wherein the optical data signal includes a data area and a non-data area, data signals exist in the data area, the non-data area is an area other than the data area and precedes the data area, and a signal amplitude of the non-data area is made higher than a signal amplitude of the data area;
    receiving an optical input including the optical data signal transmitted in the transmitting, with the predetermined receiver;
    detecting each of the signal amplitude of the non-data area and the signal amplitude of the data area of the optical input received in the receiving;
    creating a threshold for encoding the data area based on the signal amplitude of the data area detected in the detecting;
    determining whether the optical data signal is received, based on the signal amplitude of the non-data area detected in the detecting; and
    outputting a data signal in which the data area is encoded by using the threshold of the optical data signal created in the creating, when it is determined in the determining that the optical data signal is received.

2. The optical communication method according to claim 1, wherein the creating includes setting the threshold to a value of a half of an upper-end value of a signal amplitude of the data area detected in the detecting.

3. The optical communication method according to claim 1, wherein the creating includes setting the threshold to an average of signal amplitudes of the data area detected in the detecting.

4. The optical communication method according to claim 1, wherein
    the transmitting includes creating the optical data signal in which the signal amplitude of the non-data area and the signal amplitude of the data area have a certain ratio, and transmitting the optical data signal created, and
    the creating includes calculating the signal amplitude of the data area from the signal amplitude of the non-data area detected in the detecting, based on a ratio between the signal amplitude of the non-data area and the signal amplitude of the data area of the optical data signal transmitted in the transmitting, and creating the threshold from calculated signal amplitude of the data area.

5. The optical communication method according to claim 1, wherein the transmitting includes controlling a ratio between the signal amplitude of the non-data area of the data signal and the signal amplitude of the data area of the data signal by a current mirror circuit.

6. The optical communication method according to claim 1, wherein the transmitting includes controlling a ratio of output of the non-data area based on output control information about the data area of the data signal.

7. An optical-signal receiving apparatus comprising:
an optical-input receiving unit that receives optical input including an optical data signal, wherein the optical data signal includes a data area and a non-data area, data signals exist in the data area, the non-data area is an area other than the data area and precedes the data area, and a signal amplitude of the non-data area is made higher than a signal amplitude of the data area;
a first amplitude-detecting unit that detects the signal amplitude of the non-data area of the optical input received by the optical-input receiving unit;
a second amplitude-detecting unit that detects the signal amplitude of the data area of the optical input received by the optical-input receiving unit;
a threshold creating unit that creates a threshold for encoding the data area, based on the signal amplitude of the data area detected by the second amplitude-detecting unit;
a reception determining unit that determines whether the optical data signal is received, based on the signal amplitude of the non-data area detected by the first amplitude-detecting unit; and
a data output unit that outputs a data signal of which the data area is encoded by using the threshold of the optical data signal created by the threshold creating unit, when the reception determining unit determines that the optical data signal is received.

8. An optical-signal transmitting apparatus comprising:
an output control unit that makes a signal amplitude of a non-data area that is an area other than a data area of an optical data signal higher than a signal amplitude of the data area, wherein the optical data signal includes the data area and the non-data area, data signals exist in the data area, and the non-data area precedes the data area; and
an optical transmitting unit that transmits to a predetermined receiver the optical data signal of which the signal amplitude of the non-data area and the signal amplitude of the data area are controlled by the output control unit.

* * * * *